United States Patent [19]

Ishii

[11] Patent Number: 4,849,848
[45] Date of Patent: Jul. 18, 1989

[54] CIRCUIT BREAKER

[75] Inventor: Kazuhiro Ishii, Hiroshima, Japan

[73] Assignee: Mitsubishi Denki Kabushiki Kaisha, Tokyo, Japan

[21] Appl. No.: 187,139

[22] Filed: Apr. 28, 1988

[30] Foreign Application Priority Data

Apr. 30, 1987 [JP] Japan .................................. 62-109332

[51] Int. Cl.$^4$ .............................................. H01H 3/08
[52] U.S. Cl. ......................................... 361/96; 361/93; 361/97
[58] Field of Search ........................ 361/87, 93, 94, 95, 361/96, 97

[56] References Cited

U.S. PATENT DOCUMENTS 4,443,828  4/1984  Legron et al. ......................... 361/93
4,589,052  5/1986  Dougherty ............................ 361/94
4,717,985  1/1988  Demeyer ............................... 361/96

Primary Examiner—Derek S. Jennings
Attorney, Agent, or Firm—Sughrue, Mion, Zinn, Macpeak & Seas

[57] ABSTRACT

A circuit breaker in which the levels of overload currents are detected with increased accuracy and which functions properly even just often its load-connecting contacts are closed. A rectifier circuit converts outputs from current transformers into currents flowing in one direction, the current transformers detecting the currents through main the paths. A power supply circuit and current-detecting resistors are connected in series with the output of the rectifier circuit. Differential amplifiers amplify the potential differences across each resistor. If the power from the power supply circuit is insufficient to operate the differential amplifiers and a timer normally, an inhibiting circuit prevents a switch circuit from being closed.

5 Claims, 9 Drawing Sheets

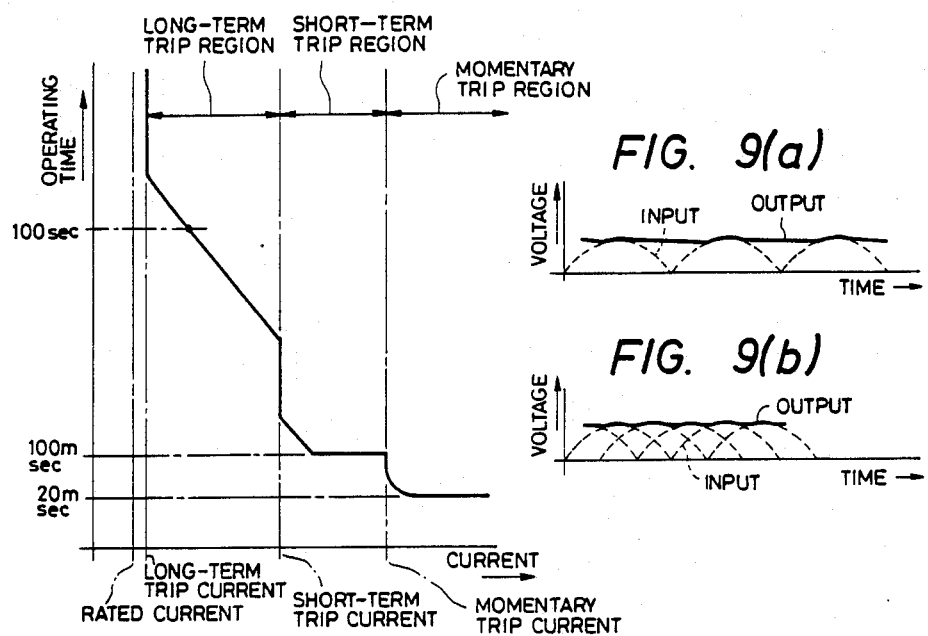
FIG. 8
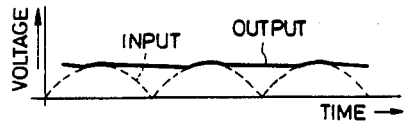
FIG. 9(a)
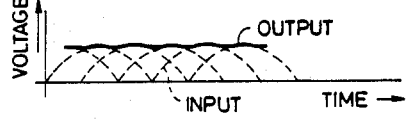
FIG. 9(b)
FIG. 10
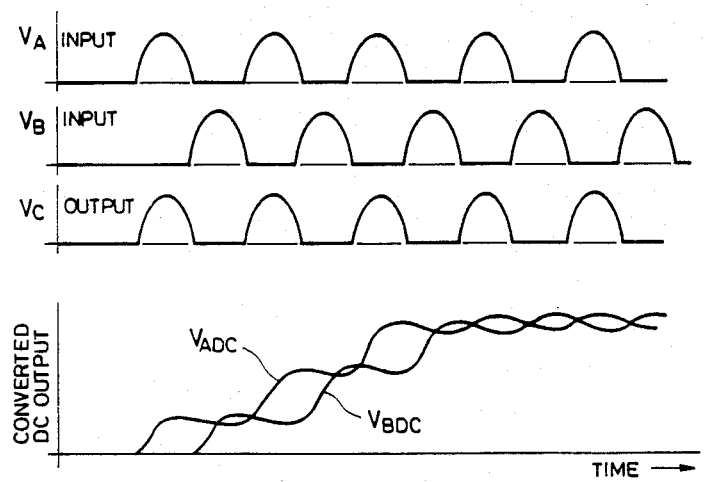

CIRCUIT BREAKER

BACKGROUND OF THE INVENTION

The present invention relates to a circuit breaker equipped with an overcurrent trip device.

FIG. 14 is a circuit diagram of a prior art circuit breaker as disclosed in Published Unexamined Application Japanese Patent No. 32211/1985.

In this figure, terminals 101, 102, 103 on the side of a three-phase power supply are connected with the power supply. These terminals 101, 102, 103 are connected with terminals 301, 302, 303 on the load side via contacts 201, 202, 203, respectively, which connect or disconnect loads with the circuit.

Electrical paths 11, 12, 13 are formed between the power supply terminals 101, 102, 103 and the load terminal 301, 302, 303, respectively. Current transformers 21, 22, 23 for detecting electric currents at different phases are inserted in the electrical paths 11, 12, 13, respectively. Full-wave rectifier circuits 31, 32, 33, connected with the secondary sides of the transformers 21, 22, 23, respectively, are used to derive the absolute values of the outputs from the secondary sides.

Shunt circuits 41, 42, 43 are connected with the outputs of the full-wave rectifier circuits 31, 32, 33, respectively. Each shunt circuit is fabricated by connecting a resistor, for example, across the DC output terminals of one of the full-wave rectifier circuits 31, 32, 33. The output terminals of the shunt circuits 41, 42, 43 are connected with respective signal converter circuits 91, 92, 93 which derive the effective values or average values of the output signals induced in the shunt circuits 41, 42, 43, respectively.

To an OR circuit 160, formed of diodes 161, 162, 163, are applied the output signals from the signal converter circuits 91, 92, 93, respectively. The output terminal of the OR circuit 160 is connected with an analog-to-digital converter circuit 100 which converts the output signal from the OR circuit into digital form. The greatest one of the output signals from the converter circuits 91, 92, 93 is fed to the A/D converter circuit 100 via the OR circuit 160. The output from the converter circuit 100 is applied to a microcomputer 110.

A thyristor 120 is triggered with the output signal from the microcomputer 110. When this thyristor 120 is turned on, an overcurrent trip device 80 of the release type is driven to mechanically open the contacts 201, 202, 203 which were closed.

An OR circuit 130 is connected to the output terminals of the full-wave rectifier circuits 31, 32, 33 which are at positive potential. The OR circuit 130 is composed of diodes 131, 132, 133. The output terminals of the full-wave rectifier circuits 31, 32, 33 which are at negative potential are connected with a common potential point or ground point.

The output terminal of the OR circuit 130 is connected to a power circuit 500 for both the A/D converter circuit 100 and the microcomputer 110. The power circuit forms a power source for operating these components. The OR circuit 130 produces a signal corresponding to the maximum value of the currents flowing through the AC paths 11, 12, 13. The output of the OR circuit 130 is connected via a zener diode 140 with a timer circuit 150 whose output terminal is connected with the gate of the thyristor 120.

When the load-connecting contacts 201, 202, 203 are closed, electric power is supplied from the power terminals 101, 102, 103 to the load terminals 301, 302, 303, respectively, via the contacts 201, 202, 203. Under this condition, if overload currents flow through the AC paths 11, 12, 13, then the transformers 21, 22, 23 for the different phases detect the overload currents at their intrinsic ratios of current transformation and induce output currents on the secondary sides.

These output signals are transformed into direct currents by the full-wave rectifier circuits 31, 32, 33, respectively, and supplied to the shunt circuits 41, 42, 43, respectively. The waveforms of the signal voltages induced in the shunt circuits 41, 42, 43 at this time are well known waveforms of absolute values. The output signals from the shunt circuits 41, 42, 43 are converted into signals corresponding to their effective or average values by the signal converter circuits 91, 92, 93, respectively, at their respective phases.

The maximum value of the effective or average values obtained by the signal converter circuits 91, 92, 93 is fed to the A/D converter circuit 100 via the OR circuit 160. The converter circuit 100 converts the analog signal applied to it in this way into digital form. The resulting digital signal is supplied to the microcomputer 110, which determines the level of the digital signal in accordance with a given program.

Then, the microcomputer produces a timeout signal after a fixed period of time according to the result of the decision made as described above, and delivers an output signal from its output port 116. This output signal appearing at the port 116 of the microcomputer 110 is applied to the gate of the thyristor 120, thus triggering it into conduction. This actuates the overcurrent trip device 80 of the release type to open the load-connecting contacts 201, 202, 203 via actuating devices (not shown) and release device (not shown). The contacts 201-203 mechanically interlock with the trip device 80. As a result, the AC paths 11, 12, 13 are broken.

Meanwhile, the voltage signals corresponding to the accidental currents and induced in the shunt circuits 41, 42, 43 are applied to the OR circuit 130 composed of the diodes 131, 132, 133. Since the output of the OR circuit 130 is connected with the timer circuit 150 via the zener diode 140, if the level of the output from the OR circuit 130 exceeds the zener voltage of the diode 140, then a signal is applied to the timer circuit 150.

The timer circuit 150 generates a timeout signal after a fixed period of time in response to the input signal to thereby trigger the gate of the thyristor 120. This activates the overcurrent trip device 80 of the release type. As a result, the circuit breaker rapidly breaks the electrical paths. In this conventional configuration, the power circuit 500 is connected in parallel with the shunt circuits 41, 42, 43. The maximum voltage at each phase is fed to the power circuit 500. The electric power from the power circuit 500 is supplied to both the microcomputer 110 and the A/C converter circuit 100.

In the prior art circuit breaker constructed as described thus far, portions of the currents appearing at the secondary sides of the current transformers 21-23 flow into the power circuit 500, the transformers 21-23 acting to detect currents. Therefore, the currents flowing through the shunt circuits 41, 42, 43 fail to correspond to the currents flowing through the AC paths 11, 12, 13 at different phases. Hence, an error arises in detecting the level of overload current. Further, the current flowing into the power circuit 500 is not constant.

Consequently, it is difficult to correct the error produced in detecting the level of overload current.

Also, the output power from the power circuit 500 is not sufficient to drive the microcomputer 110 and the A/D converter circuit 100 the moment the load-connecting contacts 201, 202, 203 are closed. Therefore, these control circuits may malfunction.

SUMMARY OF THE INVENTION

The present invention has been made to solve the foregoing problems.

It is an object of the invention to provide a circuit breaker which detects the levels of overload currents with enhanced accuracy and which can prevent its control circuits from malfunctioning when the output power from the power circuit is not sufficient as encountered just when load-connecting contacts are closed.

The circuit breaker according to the invention has a rectifier circuit for converting the outputs from current transformers into currents flowing in one direction. The transformers detect the currents flowing through AC paths. A power supply circuit and current-detecting resistors ae connected in series with the output terminal of the rectifier circuit. Differential amplifiers are provided which amplify the potential difference produced across each resistor. When the power from the power supply circuit is not sufficient to operate the differential amplifiers and a timer circuit normally, a inhibiting circuit prevents a switch circuit from being closed.

The currents flowing through the AC paths are detected by the current transformers and converted into currents flowing in one direction by the rectifier circuit. All the converted current flows into the power supply circuit and the current-detecting resistors. Since all the current flows through the resistors in this way, no error arises in detecting the currents. Therefore, the accuracy with which the levels of accidental currents are detected can be enhanced.

Also, the provision of the inhibiting circuit prevents malfunction if the current flowing through the circuit breaker is weak.

BRIEF DESCRIPTION OF THE DRAWINGS

FIG. 8 is a graph showing the tripping characteristics of the circuit breaker;

FIG. 9(*a*) is a diagram showing the input and output voltage waveforms of a peak value converter circuit driven with a single phase;

FIG. 9(*b*) is a diagram showing the input and output voltage converter circuit driven with plural phases;

FIG. 10 is a diagram for illustrating the operation of the maximum phase-selecting circuit;

DESCRIPTION OF THE PREFERRED EMBODIMENTS

Figure 1:
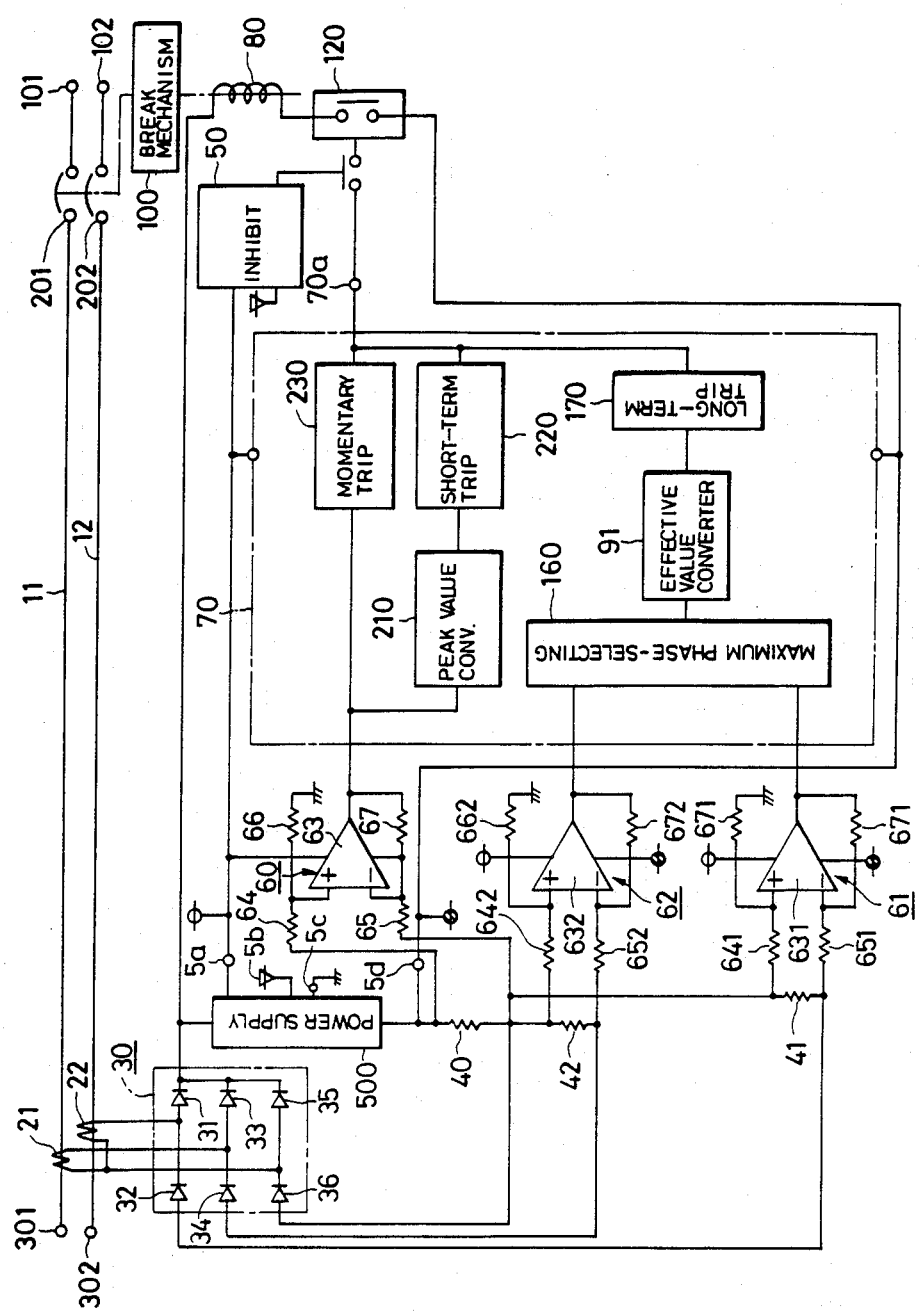
FIG. 1 is a circuit diagram of a circuit breaker according to the invention.

FIG. 1 is a circuit diagram of a circuit breaker constructed according to the invention. It is to be noted that like components are denoted by like reference numerals throughout all the figures and that those components which have been already described will not be described in detail below. In this example, the circuit breaker is described with reference to the case where it breaks two-phase AC current paths 11 and 12 for the sake of simplicity.

A rectifier circuit 30 is connected to the secondary sides of current transformers 21 and 22 so that the output current can flow in only one direction on the secondary sides. The rectifier circuit 30 includes a series combination of diodes 31 and 32, a series combination of diodes 33 and 34, and a series combination of diodes 35 and 36.

A DC power supply circuit 500, connected with the positive output terminal of the rectifier circuit 30, has a positive terminal 5a, a reference terminal 5b, an intermediate terminal 5c, and a negative terminal 5d.

Figure 2:
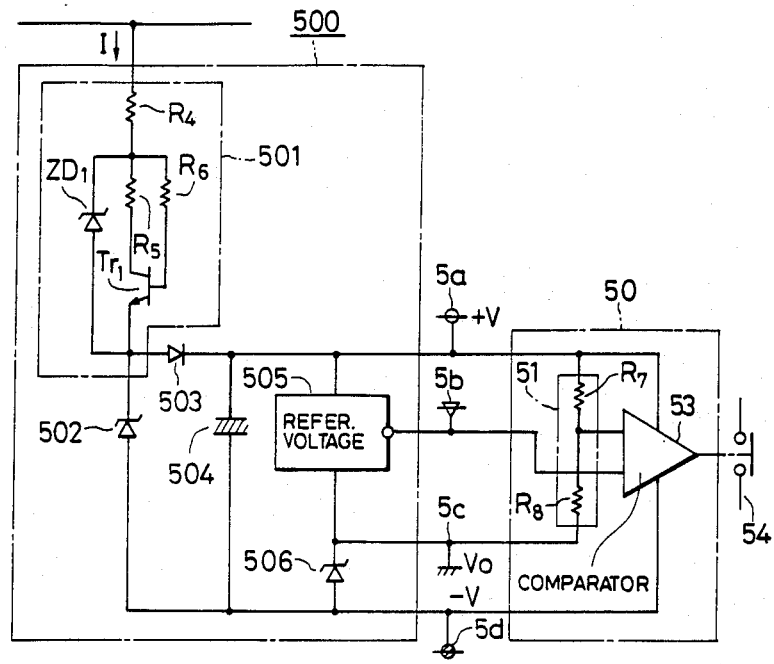
FIG. 2 is a diagram of a power circuit and an inhibiting circuit.

FIG. 2 shows an example of the power supply circuit 500. This includes an impedance circuit 501 that facilitates the operation of a tripping solenoid coil 80. The impedance circuit 501 has a series combination of resistors $R_4$ and $R_5$. This series combination is connected with the collector of a transistor $Tr_1$. A resistor $R_6$ is connected between the junction of the resistors $R_4$ and $R_5$ and the base of the transistor $Tr_1$. A zener diode $ZD_1$ is connected between the junction of the resistor $R_4$ and $R_5$ and the emitter of the transistor $Tr_1$.

A voltage-limiting element 502, which may be a zener diode, is connected in series with the impedance circuit 501. A diode 503 has its anode connected with the junction of the impedance circuit 501 and the voltage-limiting element 502. A smoothing capacitor 504 is connected between the cathode of the diode 503 and the negative terminal 5d of the power supply circuit 500. The cathode of the diode 503 is connected with the positive terminal 5a of the power supply circuit 500.

A reference voltage-generating circuit 505 is connected with the positive terminal 5a. A voltage-limiting element 506 is connected in series with the reference voltage-generating circuit 505. The junction of the limiting element 506 and the voltage-generating circuit 505 is connected to the negative terminal 5d of the power supply circuit 500. The output terminal of the voltage-generating circuit 505 is connected with the reference terminal 5b of the power supply circuit 500.

The negative terminal 5d of the power supply circuit 500 is connected to a current-detecting resistor 40, as shown in FIG. 1. The other end of the resistor 40 is connected to one end of a current-detecting resistor 41 and also to one end of another current-detecting resistor 42. The junction common to the resistors 40, 41, 42 is connected to the cathode of the diode 36 of the rectifier circuit 30. The other ends of the resistors 41 and 42 are connected with the cathodes of the diodes 32 and 34 of the rectifier circuit 30. In this configuration, fully rectified currents corresponding to load currents at each phase flow through the resistor 40. Half rectified currents corresponding to load currents at each phase flow through the resistors 41 and 42.

Differential amplifier circuits 60, 61, 62 convert the voltage drops developed across the resistors 40, 41, 42 into signals with respect to the intermediate potential $V_o$ produced by the power supply circuit 500.

The differential amplifier 60 includes an operational amplifier 63 and four resistors 64, 65, 66, 67. The differential amplifier 61 is composed of an operational amplifier 631 together with four resistors 641, 651, 661, 671. The differential amplifier 62 is composed of an operational amplifier 632 and four resistors 642, 652, 662, 672.

Electric power is supplied to the differential amplifiers 60, 61, 62 from the power supply circuit 500. The inputs of the amplifiers 60, 61, 62 are connected with the resistors 40, 41, 42, respectively. The gains of the amplifiers 60, 61, 62 are set so that the gain of the amplifier closest to the power supply circuit 500 is less than the gain of the other amplifiers. That is, gain of amplifier 60 < gain of amplifier 61 = gain of amplifier 62

A timer circuit 70 includes a momentary trip circuit 230, a short-term trip circuit 220, and a long-term trip circuit 170. The output terminals of the circuits 230, 220, 170 are connected in parallel with each other to form the output terminal 70a of the timer circuit 70.

More specifically, the momentary trip circuit 230 is connected to the output terminal of the differential amplifier 60. A series combination of a peak value converter circuit 210 and the short-term trip circuit 220 is connected in parallel with the momentary trip circuit 230. A maximum phase-selecting circuit 160 is connected with the output terminals of the differential amplifiers 61 and 62. An effective value converter circuit 91 is connected with the output terminal of the selecting circuit 160. The long-term trip circuit 170 is connected with the output terminal of the converter circuit 91.

Figure 3:
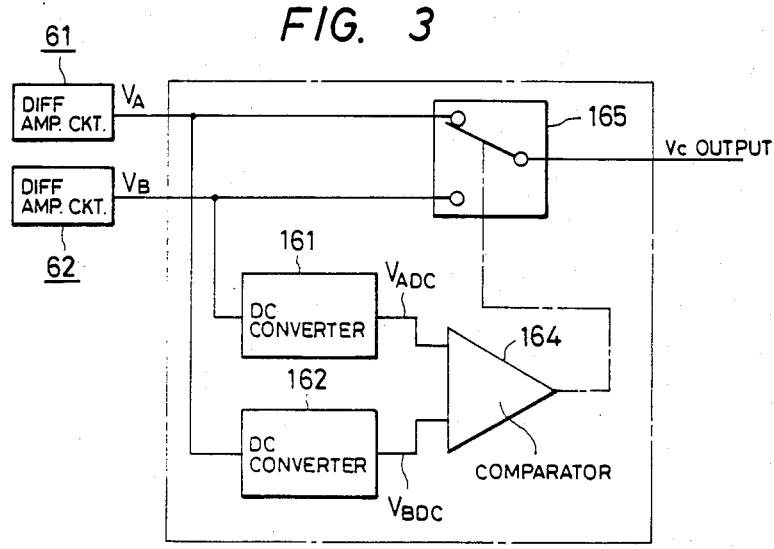
FIG. 3 is a diagram of a maximum phase-selecting circuit.

As shown in FIG. 3, the maximum phase-selecting circuit 160 includes DC converter circuits 161, 162, a comparator 164, and a selecting switch 165. The converter circuits 161 and 162 are connected to the output terminals of the differential amplifiers 62 and 61, respectively. The input terminal of the comparator 164 is connected with the output terminals of the converter circuits 161 and 162. The switch 165 is controlled by the output from the comparator 164 to select the maximum phase.

A tripping solenoid coil 80 is connected with the positive output terminal of the rectifier circuit 30. A switch circuit 120 is connected in series with the coil 80. The other end of the switch circuit 120 is connected with the negative terminal 5d of the power supply circuit 500. The coil 80 mechanically interlocks via a break mechanism 100 with contacts 201 and 202 that can be opened and closed. When the switch circuit 120 switches from open state to closed state, the contacts 201 and 202 are opened.

An inhibiting circuit 50 is connected between the output of the timer circuit 70 and the input of the switch circuit 120 to inhibit operation under insufficient voltage conditions. As shown in FIG. 2, the inhibiting circuit 50 is composed of a comparator 53 and a voltage-divider circuit 51. The divider circuit 51, composed of resistors $R_7$ and $R_8$, is connected between the positive terminal 5a and the intermediate terminal 5c of the power supply circuit 500. The junction of the resistors $R_7$ and $R_8$ is connected with one input terminal of the comparator 53, the other input terminal being connected with the reference terminal 5b. The inhibiting circuit 50 has an output switch 54.

The configuration constructed as described above operates in the manner described below.

When electric currents flow through the AC paths 11 and 12, secondary currents which are determined by the intrinsic ratios of current transformation of the current transformers 21, 22 flow through the secondary windings of the transformers. The secondary currents are converted into currents flowing in one direction by the rectifier circuit 30. The output current from the rectifier circuit 30 passes through the power supply circuit 500 and the detecting resistors 40, 41, 42 and returns to the rectifier circuit 30. At this time, fully rectified currents corresponding to load currents passing through the paths 11 and 12 at each phase flow through the power suppl circuit 500 and the resistor 40. Half rectified currents corresponding to load currents at each phase flow through the other resistors 41 and 42.

Figure 4:
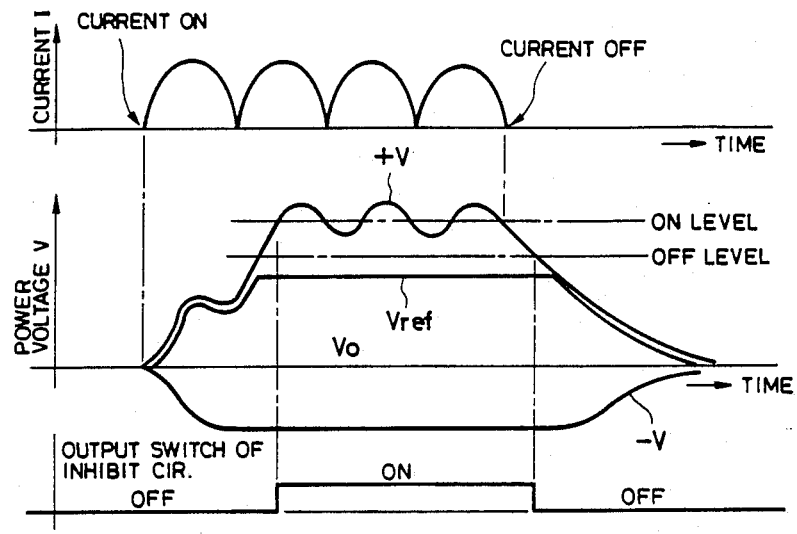
FIG. 4 is a graph for illustrating the operation of the power circuit and the inhibiting circuit.

When a fully rectified current flows into the power supply circuit 500 of the structure shown in FIG. 2, voltages of $+V$, $V_{ref}$, and $-V$ with respect to the potential $V_o$ at the grounded intermediate terminal 5c as shown in FIG. 4 are produced. The output voltage $+V$ appearing at the output terminal 5a may contain a ripple component. The relation between the output voltages $+V$ and $V_{ref}$ is given by:

$$+V > V_{ref}$$

The output voltage from the power supply circuit 500 is supplied to the inhibiting circuit 50. If the output voltage $+V$ exceeds the ON level shown in FIG. 4 because of the hysteresis of the comparator 53, the output switch 54 is closed. If the voltage $+V$ is less than the OFF level, the switch 54 is opened.

The difference between the ON level and the OFF level is set larger than the ripple component of the output voltage $+V$ to prevent the ripple component from turning the switch 54 on and off repeatedly.

In particular, when the output voltage $+V$ is in excess of a predetermined value, the output Voltage $V_{ref}$ is sufficiently regulated. The output switch 54 of the inhibiting circuit 50 is closed only when the output voltage $-V$ is equal to a preset value.

Electric power is supplied to the differential amplifiers 60, 61, 62 from the power supply circuit 500. The amplifiers 60, 61, 62 receive input signals from the current-detecting resistors 40, 41, 42, respectively.

As mentioned previously, the gains of the differential amplifiers 60, 61, 62 have the relationship:

gain of amplifier 60 < gain of amplifier 61 = gain of amplifier 62

Figure 5:
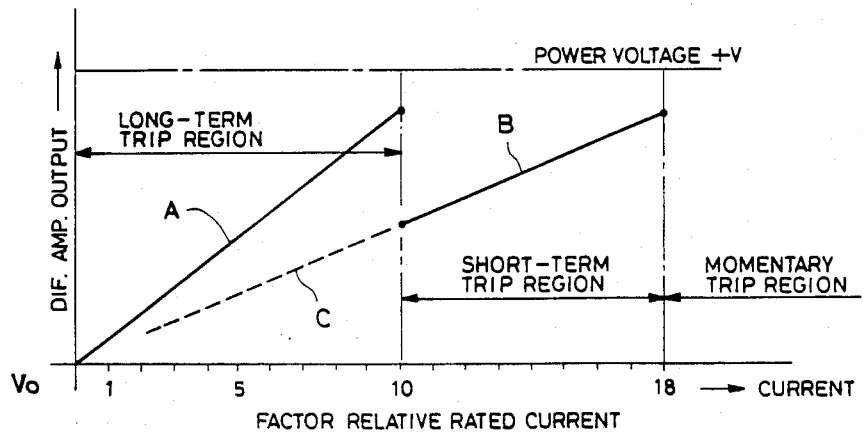
FIG. 5 is a graph for illustrating the operation of differential amplifiers.

Therefore, as shown in FIG. 5, the characteristic A of the output voltage from the amplifier 60 can be made higher in a long-term trip region. That is, quite small changes in currents can be accurately detected within this region.

The output voltages from the other differential amplifiers 61 and 62 exhibit a characteristic B that covers a short-term trip region in which current changes greatly. For this reason, this characteristic B can be the same as the conventional characteristic C.

Figure 6:
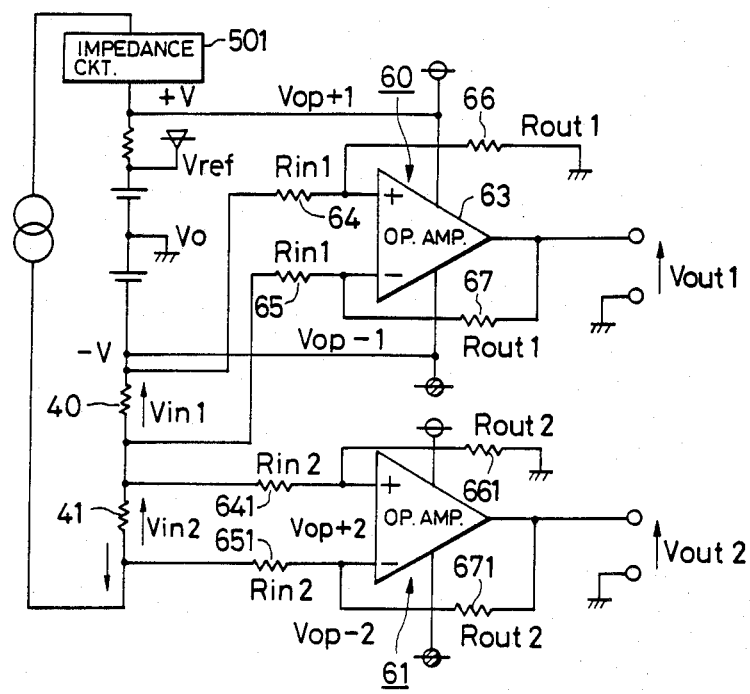
FIG. 6 is an equivalent circuit diagram of the power circuit and the differential amplifiers.
Figure 7:
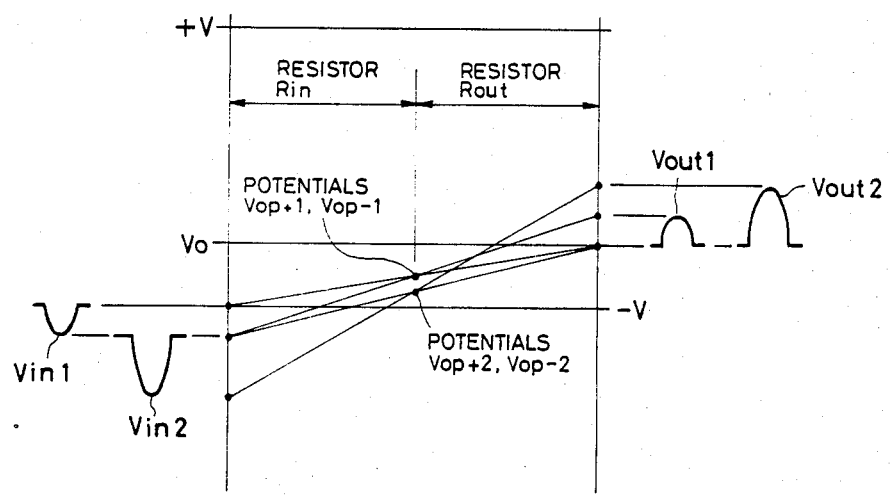
FIG. 7 is a graph for illustrating the operation of the power circuit and the differential amplifiers.

In order to operate the differential amplifiers 60-62 adequately, it is essential to satisfy the following conditions as will now be described. FIG. 6 shows an equivalent circuit of the power supply circuit 500 and the amplifiers 60, 61. In order that the above-described circuit operate as a differential amplifier, potentials $V_{op+1}$ and $V_{op-1}$ applied to the amplifier 60 are required to lie between the output voltages $+V$ and $-V$ from the power supply circuit 500. As shown in FIG. 7, resistors $R_{in}$ connected to the inputs of the amplifier 60 and resistors $R_{out}$ connected to the outputs have resistances which are set so as to meet this requirement.

Similar conditions are imposed on the differential amplifiers 61 and 62. Within the short-term trip region, potentials $V_{op+2}$ and $V_{op-2}$ applied to the differential amplifier 61 deviate from the output voltage $-V$ from the power supply circuit 500, so that it fails to operate. However, no problems arise because the differential amplifier 60 is operating at this time.

When the instantaneous value of the output from the differential amplifier 60 exceeds the momentary trip region shown in FIG. 8, the momentary trip circuit 230 delivers an output signal that acts as the output signal from the timer circuit 70.

The output from the differential amplifier 60 is fed to the peak value converter circuit 210. The waveforms of input and output voltages of the converter circuit 210 are shown in FIGS. 9(a) and 9(b). FIG. 9(a) shows a trip characteristic obtained by a single-phase operation. FIG. 9(b) shows a trip characteristic derived by a polyphase operation. The converter circuit 210 serves to make no difference between these two characteristics.

The output from the peak value converter circuit 210 is applied to the short-term trip circuit 220. When that output current goes beyond the short-term trip region shown in FIG. 7, the trip circuit 220 produces an output signal that acts as the output signal from the timer circuit 70.

The outputs from the differential amplifier circuits 61 and 62 are applied to the maximum phase-selecting circuit 160, as shown in FIGS. 3 and 10. These input signals are applied to the DC converter circuits 161 and 162, which convert them into DC voltages containing a small amount of ripple. The comparator 164 has hysteresis, and hence once a phase is selected, the highest priority is given to that phase, even if the same signal voltage is applied subsequently. In the example shown in FIG. 10, the output voltage $V_A$ from the amplifier 61 is selected. Therefore, signal $V_B$ is not selected until the following condition is fulfilled:

$$V_B > V_A \times \frac{\text{average } V_{ADC} + \text{ripple of } V_{ADC}}{\text{average } V_{ADC}}$$

This is done to prevent the signal from being switched between $V_A$ and $V_B$ many times within several cycles; otherwise the following effective value converter circuit 91 would introduce error.

The signal of the phase selected by the maximum phase-selecting circuit 160 is applied to the effective value converter circuit 91. The output signal is converted into a DC signal. The output signal from the converter circuit 91 is fed to the long-term trip circuit 170. When the output current exceeds the long-term trip region shown in FIG. 7, the trip circuit 220 delivers an output signal acting as the output signal from the timer circuit 70.

The output from the timer circuit 70 is fed via the output switch of the inhibiting circuit 50 to the input of the switch circuit 120, triggering the input. Then, the output of the switch circuit 120 is switched from open state to closed state, followed by energization of the solenoid trip, device 120. This trip device 120 opens the contacts 201 and 202, cutting off overload currents. The operating characteristic curve as described above is shown in FIG. 8.

If the current flowing through the contacts 201 and 202 is as small as about 10 to 20% of the rated current, the output voltage from the power supply circuit 500 is not sufficient to operate the timer circuit 70. In this state, the output switch of the inhibiting circuit 50 is opened to prevent the switch circuit 120 from operating to keep the timer circuit 70 from producing an erroneous output.

Figure 11:
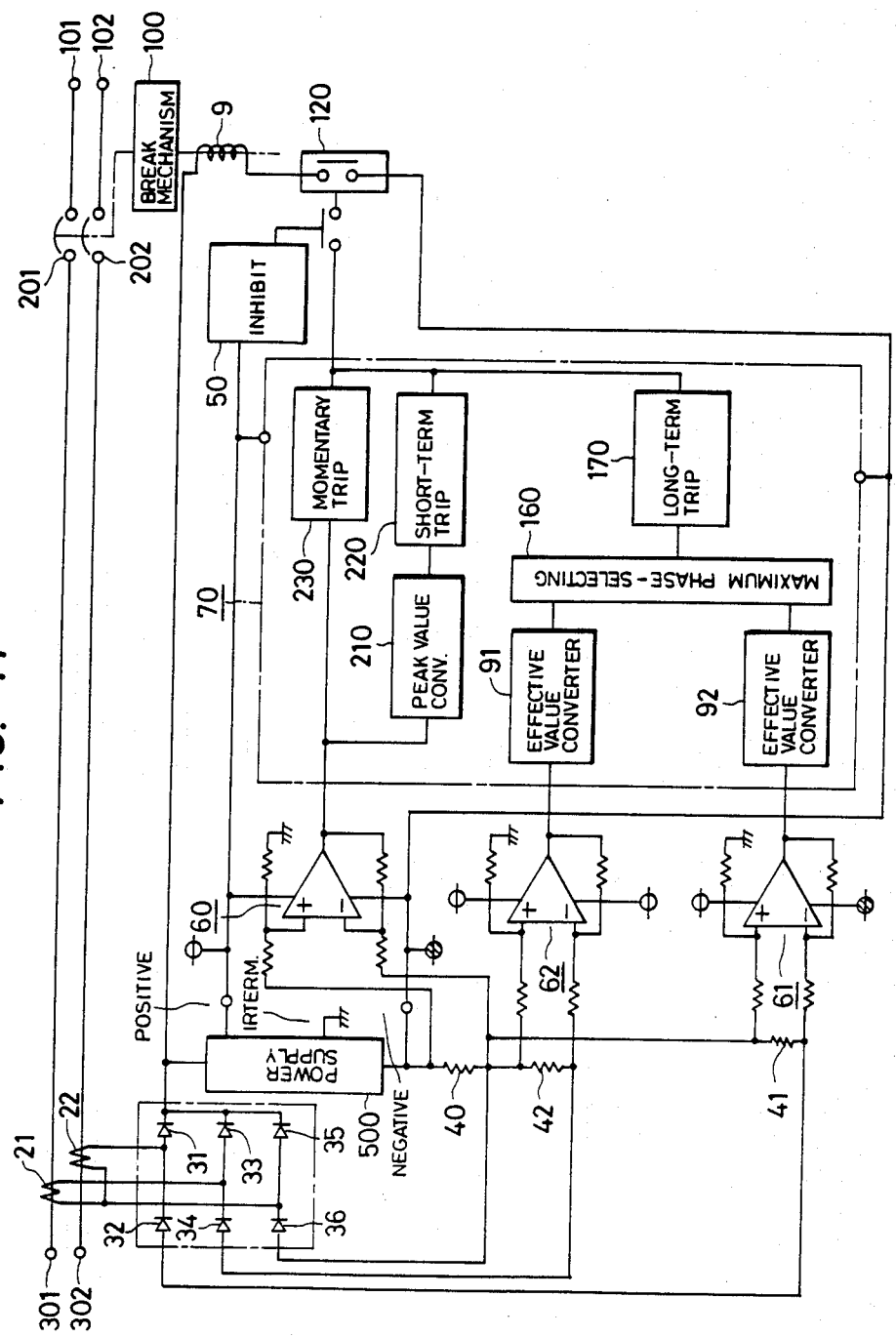
FIGS. 11–13 are circuit diagrams of other circuit breakers according to the invention.

FIG. 11 shows another example in which effective value converter circuits 91 and 92 are placed before the maximum phase-selecting circuit 160.

Figure 12:
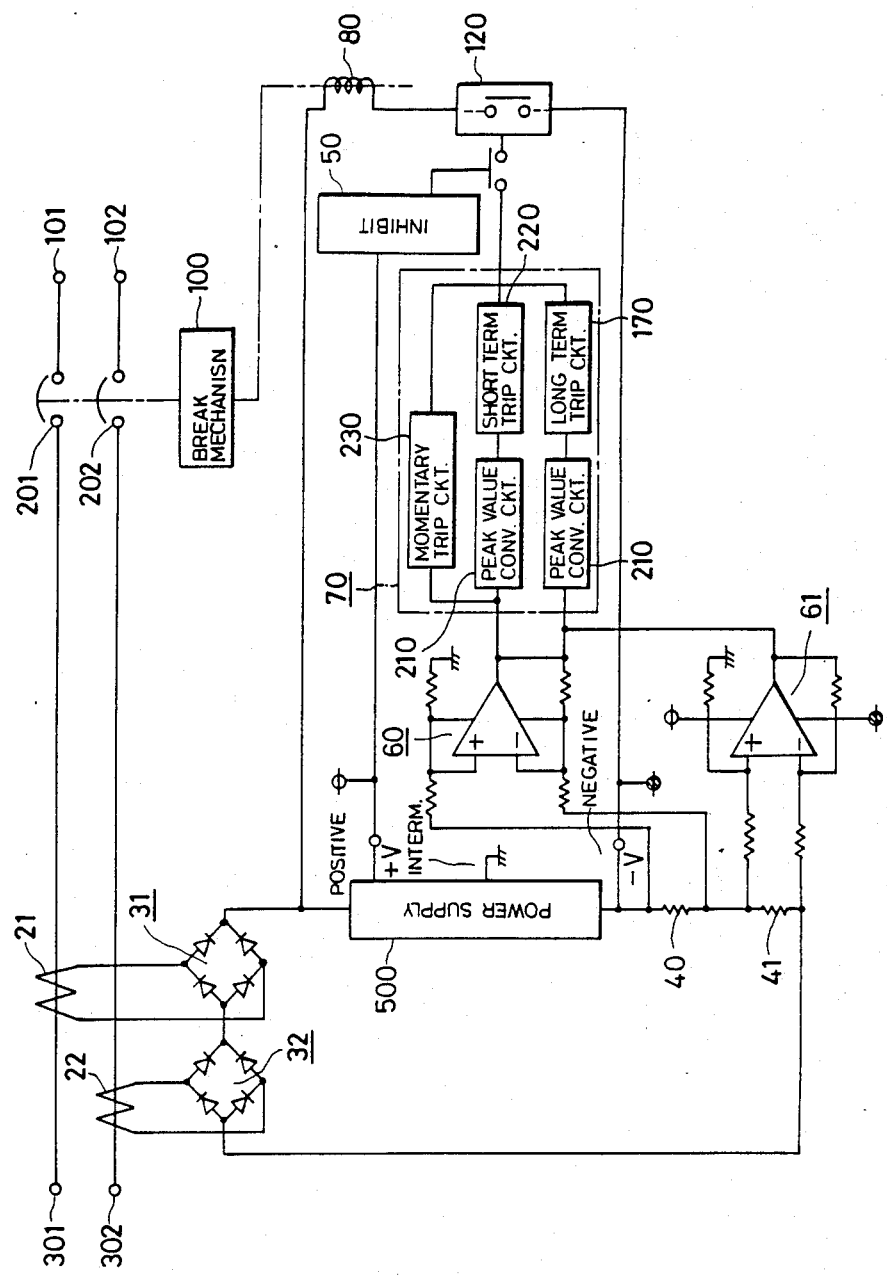

FIG. 12 shows a circuit in which full-wave rectifier circuits 31 and 32 are connected in series. This circuit is unable to detect effective values but can offer an inexpensive circuit breaker.

Figure 13:
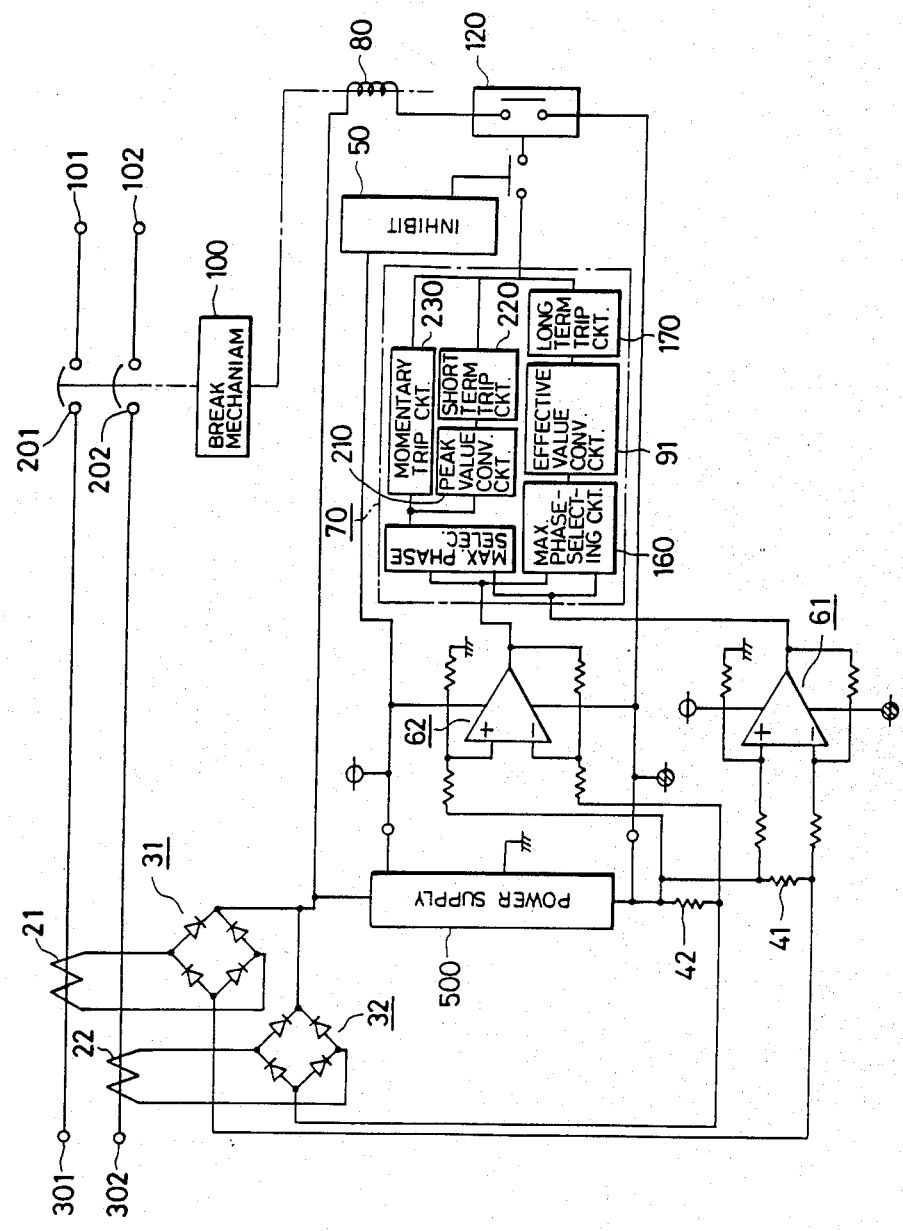
Figure 14:
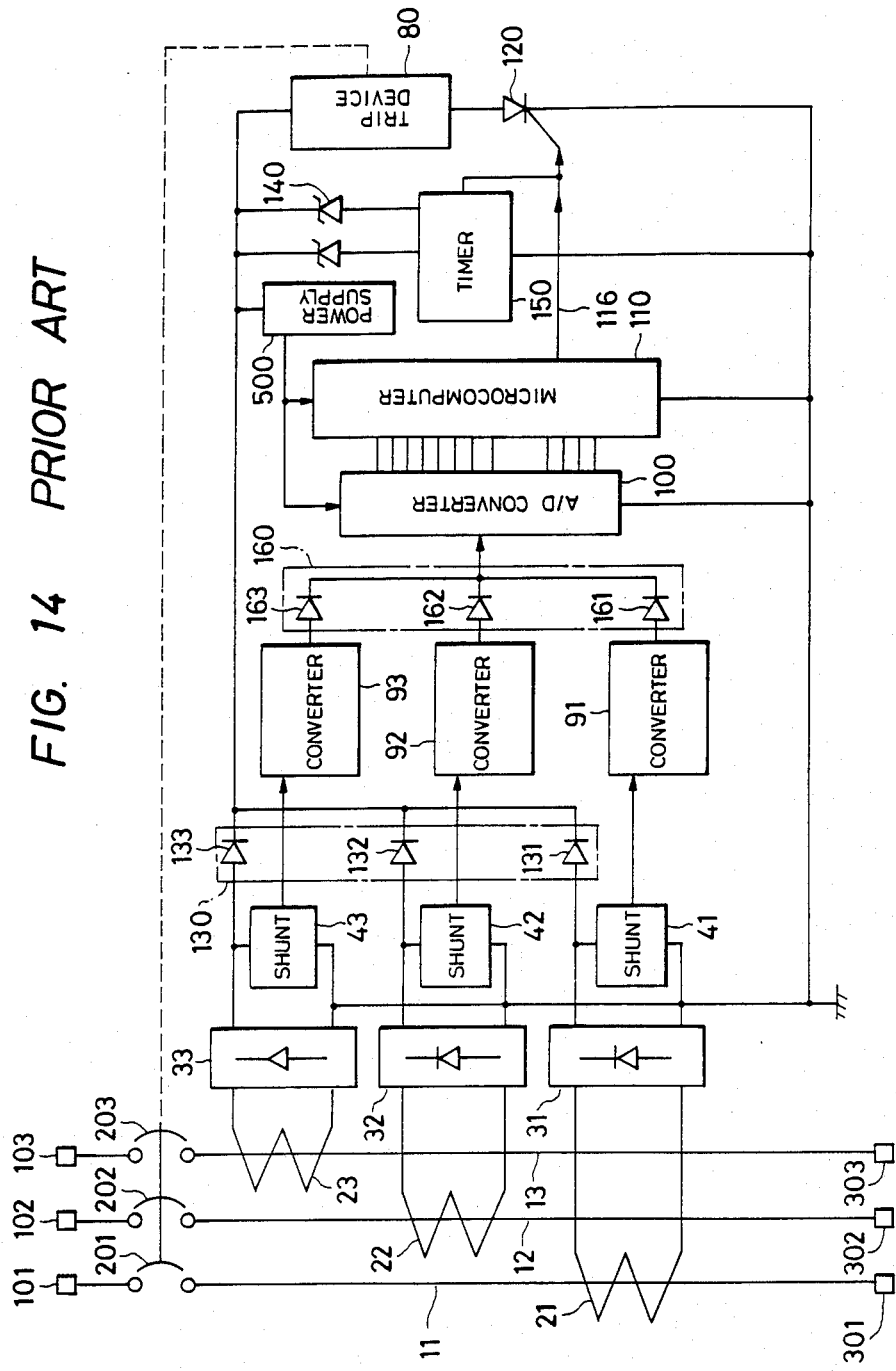
FIG. 14 is a circuit diagram of a conventional circuit breaker.

Referring next to FIG. 13, full-wave rectifier circuits 31 and 32 are connected in series with detecting resistors 41 and 42, respectively. The series combinations are connected in parallel.

In the above examples, each circuit breaker breaks two-phase AC paths 11 and 12. Of course, the invention can also be applid to a circuit breaker that breaks a single-phase AC path of three phase paths.

As described above, in accordance with the invention, the control circuit of a circuit breaker connects a power supply circuit in series with current-detecting resistors. The potential difference produced across each resistor is introduced into the power supply circuit by differential amplifiers. The output is available only when the power supply circuit voltage is sufficient to operate the control circuit. Hence, accurate tripping characteristics can be achieved economically.

I claim:

1. A circuit breaker comprising:
load-connecting contacts inserted in AC paths;
current transformers for detecting electric currents flowing through the contanacts;
a rectifier circuit connected to secondary windings of the current transformers for converting AC currents flowing through secondary sides of the transformers into currents flowing in one direction, said rectifier circuit having a positive output terminal and a negative output terminal;
a DC power supply circuit connected with the positive output terminal of said rectifier circuit, said DC power circuit having a positive output terminal, an intermediate output terminal, and a negative output terminal at which a positive potential, an intermediate potential, and a negative potential, respectively, are thereby applied;
current-detecting resistors connected between the negative output terminal of the DC power supply and the negative output terminal of said rectifier circuit;
differential amplifier circuits powered by the power supply circuit and converting voltage drops developed across the resistors into output signals with respect to the intermediate potential delivered by the power supply circuit such that output signals thereof lie between the positive potential and the negative potential delivered by the power supply circuit, the voltage drops developed across the resistors being in proportion to the currents flowing in said one direction;

a timer circuit powered by the power supply circuit and receiving the output signals from the differential amplifier circuits, the output signals being in proportion to the currents flowing in said one direction, the timer circuit generating an output signal after a predetermined time in accordance with a value of the current flowing in said one direction;

a switch circuit which is closed by the output from the timer circuit;

a tripping solenoid coil connected in series with the switch circuit forming a series circuit between the junction of the rectifier circuit and the power supply circuit and the junction of the power supply circuit and the current-detecting resistors;

a break mechanism energized when the switch circuit is closed and which is driven by the tripping solenoid coil to open the load-connecting contacts; and an inhibiting circuit for, when the output voltage from the power supply circuit is not sufficient to operate the differential amplifiers and the timer circuit normally, preventing the switch circuit from being closed.

2. The circuit breaker of claim 1, wherein said current-detecting resistors are connected in series, and wherein a plurality of differential amplifiers are provided to convert the voltage drops developed across the resistors into output signals with respect to the intermediate potential delivered by the power supply circuit such that the output signals lie between the positive output and the negative output from the power supply circuit, a one of the differential amplifiers disposed remotely from the power supply circuit having a gain larger than that of the other differential amplifiers.

3. The circuit breaker of claim 2, wherein said timer circuit comprises: a momentary trip circuit connected with the output terminal of the differential amplifier disposed close to the power supply circuit; a series combination of a converter circuit and a short-term trip circuit, the series combination being connected in parallel with the momentary trip circuit; and a series combination of a converter circuit and a long-term trip circuit, the series combination being connected with the output terminals of the differential amplifiers disposed remotely from the power supply circuit.

4. A circuit breaker comprising:
load-connecting contacts inserted in AC paths;
current transformers for detecting electric currents flowing through the contacts;
a rectifier circuit connected to secondary windings of the current transformers for converting AC currents flowing through secondary sides of the transformers into currents flowing in one direction, said rectifier circuit having a positive output terminal and a plurality of negative output terminals;
a DC power supply circuit connected with the positive output terminal of said rectifier circuit, said DC power supply circuit having a positive output terminal, an intermediate output terminal, and a negative output terminal at which a positive potential, an intermediate potential, and a negative potential, respectively, are thereby applied;
current-detecting resistors connected between the negative output terminal of the power supply circuit and the negative output terminal of the rectifier circuit;

differential amplifier circuits powered by the power supply circuit and converting voltage drops developed across the resistors into output signals with respect to the intermediate potential delivered by the power supply circuit such that output signals thereof lie between the positive potential and the negative potential delivered by the power supply circuit, the voltage drops developed across the resistors being in proportion to the currents flowing in said one direction;

a timer circuit powered by the power supply circuit and receiving the output signals from the differential amplifier circuits, the output signals being in proportion to the currents flowing in said one direction, the timer circuit generating an output signal after a predetermined time in accordance with a value of the current flowing in said one direction;

a switch circuit which is closed by the output from the timer circuit;

a tripping solenoid coil connected in series with the switch circuit forming a series circuit between the junction of the rectifier circuit and the power supply circuit and the junction of the power supply circuit and the current-detecting resistors;

a break mechanism energized when the switch circuit is closed and which is driven by the tripping solenoid coil to open the load-connecting contacts; and an inhibiting circuit for, when the output voltage from the power supply circuit is not sufficient to operate the differential amplifiers and the timer circuit normally, preventing the switch circuit from being closed; and wherein, said load-connecting contacts being inserted in polyphase AC paths;

one of said detecting resistors is connected with the negative terminal of the power supply circuit in such a way that a current flows therethrough in one direction, the current being in proportion to the greatest value of the instantaneous values of the currents flowing through the contacts, and a plurality of said detecting resistors being connected between the other end of said one of said detecting resistors and a plurality of the negative terminals of said rectifier circuit, respectively, so that each current of said plurality of said detecting resistors is in proportion to the current flowing through each contact;

a plurality of said differential amplifiers converting the voltage drops developed across the detecting resistors disposed remotely from the power supply circuit into output signals with respect to the intermediate potential; and wherein the circuit breaker further comprises a maximum phase-selecting circuit connected with the output terminals of the differential amplifiers for selecting the phase at which the currents flowing in said one direction and varying in proportion to the currents flowing through the contacts assume maximum values, the output voltage from the selecting circuit being applied to an effective value converter circuit.

5. A circuit breaker comprising:
load-connecting contacts instead in AC paths;
current transformers for detecting electric currents flowing through the contacts;
a rectifier circuit connected to secondary windings of the current transformers for converting AC currents flowing through secondary sides of the transformers into currents flowing in one direction, said rectifier circuit having a positive output terminal and a plurality of negative output terminals;

a DC power supply circuit connected with the positive output terminal of the rectifier circuit, said DC power supply circuit having a positive output terminal, an intermediate output terminal, and a negative output terminal at which a positive potential, an intermedaite potential, and a negative potential, respectively, are thereby applied;

current-detecting resistors connected between the negative output terminal of the power supply circuit and the negative circuit terminal of the rectifier circuit;

differential amplifier circuits powered by the power supply circuit and converting voltage drops developed across the resistors into output signals with respect to the intermediate potential delivered by the power supply circuit such that output signals thereof lie between the positive potential and the negative potential delivered by the power supply circuit, the voltage drops developed across the resistors being in proportion to the currents flowing in said one direction;

a timer circuit powered by the power supply circuit and receiving the output signals from the differential amplifier circuits, the output signals being in proportion to the currents flowing in said one direction, the timer circuit generating an output signal after a predetermined time in accordance with a value of the current flowing in said one direction;

a switch circuit which is closed by the output from the timer circuit;

a tripping solenoid coil connected in series with the switch circuit forming a series circuit between the junction of the rectifier circuit and the power supply circuit and the junction of the power supply circuit and the current-detecting resistors;

a break mechanism energized when the switch circuit is closed and which is driven by the tripping solenoid coil to open the load-connecting contacts; and an inhibiting circuit for, when the output voltage from the power supply circuit is not sufficient to operate the differential amplifiers and the timer circuit normally, preventing the switch circuit from being closed; and wherein said load-connecting contacts being inserted in polyphase AC paths;

one of said detecting resistors is connected with the negative terminal of the power supply circuit in such a way that a current flows therethrough in one direction, the current being in proportion to the greatest value of the instantaneous values of the currents flowing through the contacts;

a plurality of said detecting resistors connected between the other end of said one detecting resistor and a plurality of the negative output terminals of said rectifier circuit so that currents flowing through the plurality of resistors are in proportion to the current flowing through each contact, respectively;

a plurality of said differential amplifiers converting voltage drops developed across the plurality of detecting resistors disposed remotely from the power supply circuit into output signals with respect to the intermediate potential;

a plurality of effective value converter circuits connected with the output terminals of the differential amplifiers;

a maximum phase-selecting circuit connected with the output terminals of the effective value converter circuits and acting to select the phase at which the currents flowing in said one direction and varying in proportion to the currents flowing through the contacts assume maximum values; and a long-term trip circuit connected with the output terminal of the maximum phase-selecting circuit.

* * * * *